United States Patent [19]

Simmons

[11] Patent Number: 4,893,687
[45] Date of Patent: Jan. 16, 1990

[54] MOUNTING ARRANGEMENT FOR A POWER TRAIN MODULE OF A VEHICLE

[75] Inventor: Gerald P. Simmons, Morton, Ill.

[73] Assignee: Caterpillar Inc., Peoria, Ill.

[21] Appl. No.: 318,433

[22] Filed: Feb. 28, 1989

Related U.S. Application Data

[63] Continuation of Ser. No. 126,379, Nov. 30, 1987, abandoned.

[51] Int. Cl.$^4$ .................. B62D 55/065; B62D 55/096
[52] U.S. Cl. ........................... 180/9.1; 180/9.5; 180/291; 305/35 R; 305/35 EB
[58] Field of Search ............ 180/9.1, 6.7, 9, 9.5, 180/9.62, 9.26, 9.28, 9.3, 9.42, 9.54, 9.52, 291, 294, 295, 297, 298, 299, 89.1; 280/781; 305/35 R, 35 EB, 33

[56] References Cited

U.S. PATENT DOCUMENTS

| | | | |
|---|---|---|---|
| 699,808 | 5/1902 | Norris | 74/710.5 |
| 1,126,592 | 1/1915 | Twombly | 180/294 |
| 1,893,609 | 1/1933 | Austin | 180/294 |
| 1,976,701 | 10/1934 | Trott | 180/64 |
| 2,076,034 | 4/1937 | Lampman | 248/358 |
| 2,241,453 | 5/1941 | Fry et al. | 74/314 |
| 2,368,121 | 1/1945 | Dunham | 414/113 |
| 2,471,429 | 5/1949 | Hawkins | 180/54 |
| 2,476,460 | 7/1949 | Smith | 305/10 |
| 2,477,789 | 8/1949 | Dunham | 180/54 |
| 2,518,481 | 8/1950 | Maguire | 180/6.7 |
| 2,953,040 | 9/1960 | Christenson et al. | 74/781 |
| 2,993,715 | 7/1961 | Hutton | 287/85 |
| 3,244,116 | 5/1966 | McGlade | 105/96 |
| 3,244,117 | 5/1966 | Yuhas | 105/96.1 |
| 3,662,849 | 5/1972 | Bostad et al. | 180/54 |
| 4,131,169 | 12/1978 | Eickhoff et al. | 180/9.62 |
| 4,434,680 | 3/1984 | Riediger | 74/682 |
| 4,506,757 | 3/1985 | Matsumoto | 180/294 |
| 4,523,655 | 6/1985 | Keenan | 180/9.1 |
| 4,687,071 | 8/1987 | Hartz et al. | 180/9.1 |

FOREIGN PATENT DOCUMENTS

| 13136 | 1/1989 | Japan | 305/35 EB |
|---|---|---|---|
| 916890 | 1/1963 | United Kingdom | 180/9.23 |

*Primary Examiner*—Charles A. Marmor
*Assistant Examiner*—A. Boehler
*Attorney, Agent, or Firm*—Charles E. Lanchantin, Jr.

[57] ABSTRACT

The installation of a power train module on the frame of a track-type vehicle is simplified and noise transmisson to the frame is significantly reduced by a mounting arrangement including a pair of first elastomeric coupling devices and a pair of second elastomeric coupling devices for resiliently connecting the power train module to the main frame. The power train module has a pair of oppositely extending hollow trunnions, a wheel rotatably supported on each trunnion, an output drive train for driving each wheel, and an endless drive belt frictionally driven by each wheel. The frame has a pair of generally semicylindrical pockets which face upwardly and rearwardly and the first coupling devices are seated in the respective pockets in embracing relationship to the trunnions such that the drive wheels are elevated above the ground. The second coupling devices are connected to the frame for resisting rotational forces of the power train module about the axis of the trunnions. The power train module is easily installed at an inclined angle, and the vehicle is quiet in operation because of the noise-isolation qualities of the coupling devices and frictional contact between the wheels and the drive belts.

21 Claims, 4 Drawing Sheets

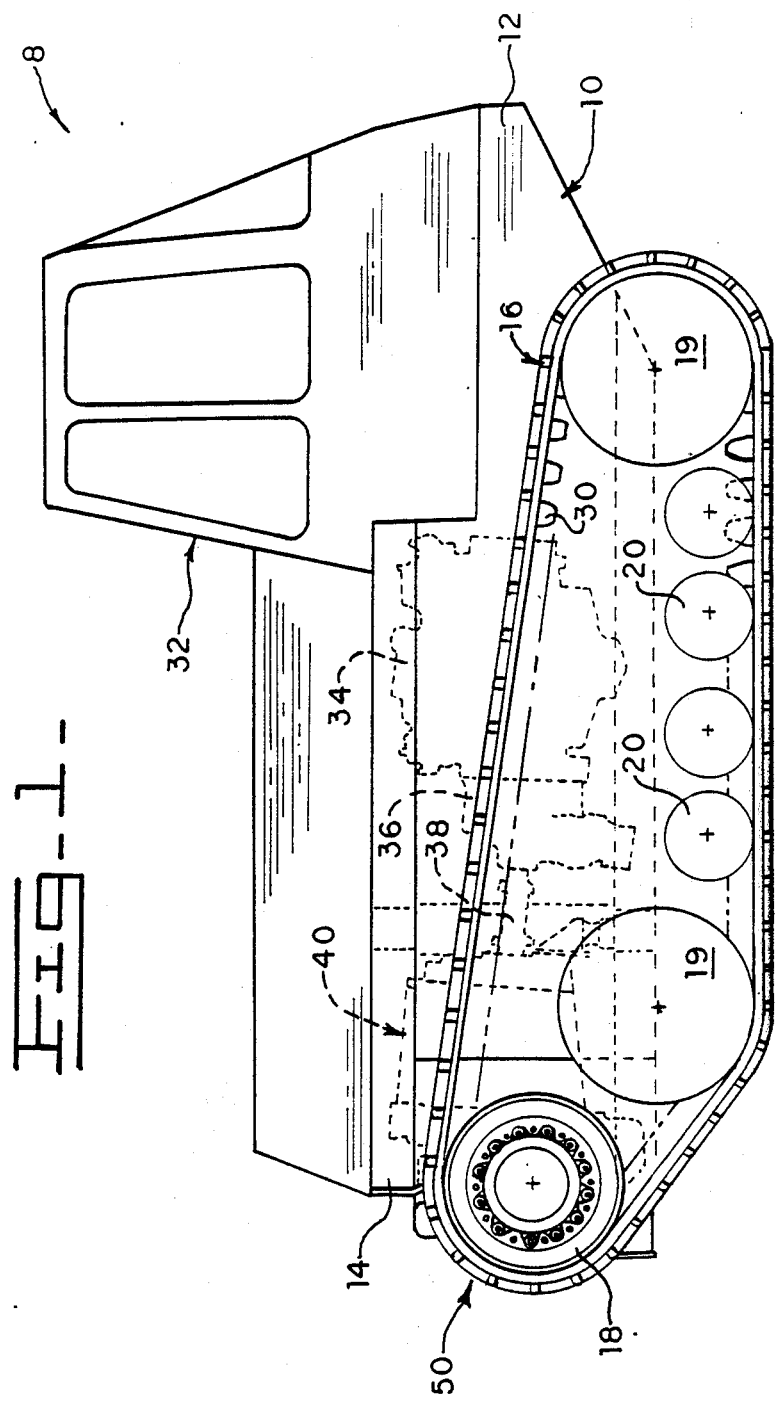

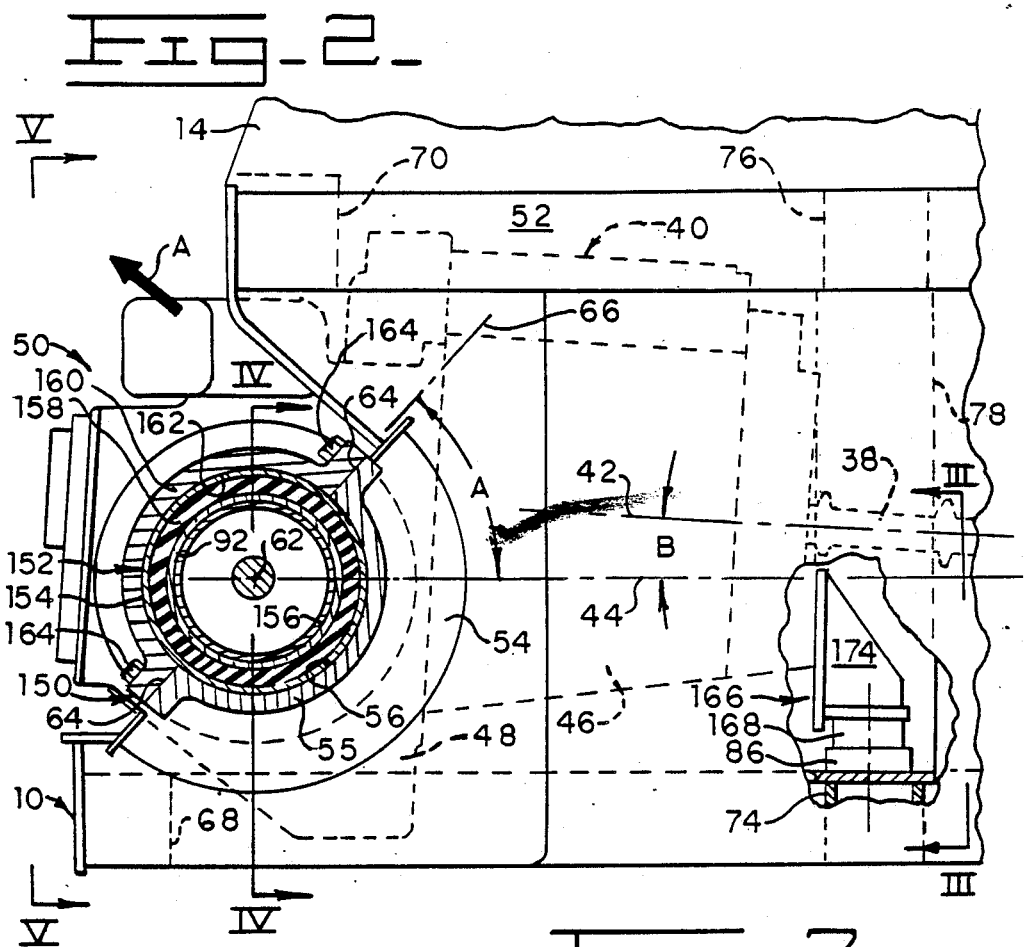
Fig_2_
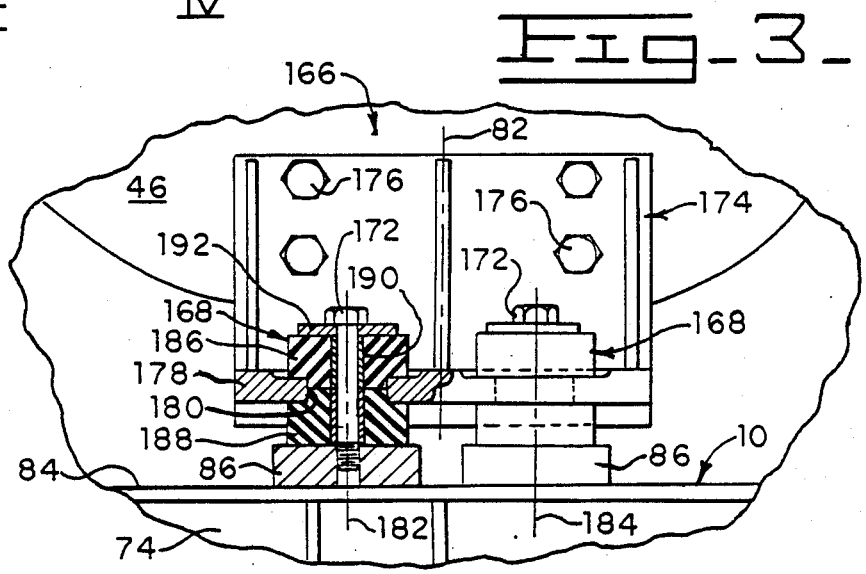
Fig_3_

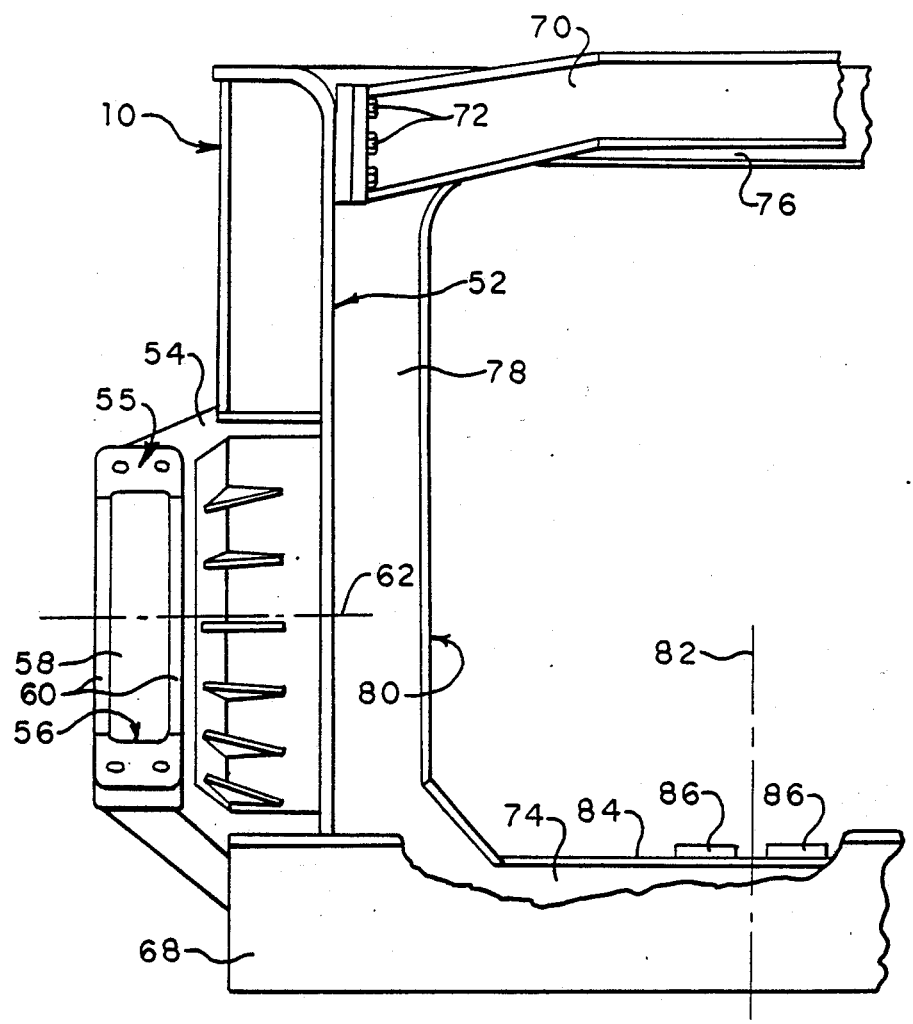

MOUNTING ARRANGEMENT FOR A POWER TRAIN MODULE OF A VEHICLE

This is a continuation of Ser. No. 07/126,379, filed Nov. 30, 1987, now abandoned.

DESCRIPTION

TECHNICAL FIELD

This invention relates to a mounting arrangement for a power train module of a vehicle such as a track-type tractor or the like, and more particularly to a power train module including a cross drive mechanism which is releasably connected to a main frame as a unit in an efficacious manner.

BACKGROUND ART

It has been the general practice to releasably secure a transmission and associated cross drive mechanism of a track-type vehicle to the main frame laterally within the sidewalls so that the transverse central axis of the cross drive mechanism is in precise alignment with the input axis of the final drives. The final drives typically have a plurality of gears for speed ratio reduction purposes, and are separately releasably secured to the outer surfaces of the sidewalls. There are several problems associated with such arrangements. Firstly, the main frame and the cross drive housing need to be very accurately machined to insure alignment of the axes. Secondly, the components are separately assembled or disassembled which is often time consuming because so many fasteners are used. Thirdly, in order to maintain alignment of the axes, the parts are assembled in a rigid metal-to-metal manner so that vexatious noises emanating from within the power train or generated at the track drive wheels are transmitted to the main frame and to the operator.

U.S. Pat. No. 4,506,757 issued to T. Matsumoto, et al on Mar. 26, 1985 relates to a track-type vehicle and is representative of the prior art. A longitudinally oriented transmission is connected to a cross drive mechanism having a pair of oppositely extending output shafts, and these components are releasably connected to the inside portions of the main frame as a module. The final drives are separately connected to the outside portions of the main frame so that considerable complexity is involved. The housing of the cross drive mechanism has opposite tubular bosses which are seated in directly upwardly facing semicircular recesses formed in the main frame, and clamps fit over the upper halves of the bosses to releasably hold them in place. The rearwardly located bosses of the housing are allowed to pivot and the front of the transmission is connected to the main frame by transversely oriented resilient bushing assemblies which resist torque loads about the cross drive axis. However, transmission induced noises can undesirably travel directly to the main frame through the metal-to-metal connections at the tubular bosses, and can travel from the track drive sprockets to the main frame directly through the final drives.

Accordingly, what is needed is an economical yet rugged mounting arrangement for a power train module including a cross drive mechanism that will allow testing of the module as a complete subassembly prior to being installed on the vehicle. And, the installation of the power train module on the main frame should be simple and convenient. In marked contrast, the assembly of the construction shown in aforementioned U.S. Pat. No. 4,506,757 requires that the transmission and cross drive mechanism be substantially vertically lowered into place; this unfortunately necessitates that a significant number of tractor components be removed in the region of the operator station to allow access to the main frame.

Also, what is needed is a mounting arrangement for a power train module that can allow a relatively economical main frame construction to be used.

And further, the power train module mounting arrangement should preferably include resilient connections to the main frame such as by elastomeric or rubber coupling assemblies for minimizing the transmission of noise from the power train module to the main frame and for minimizing the transmission of noise generated at the drive wheel by the track to the main frame.

And still further, the power train module should preferably locate the opposite final reduction gearing laterally inwardly of the cross drive mechanism so that the opposite drive wheels can be conveniently connected thereto or removed therefrom, and so that the mounting arrangement to the frame can be made smaller or simplified thereat.

DISCLOSURE OF THE INVENTION

The present invention is directed to overcoming one or more of the above problems.

In one aspect of the invention, there is provided a mounting arrangement for a power train module of a vehicle having a frame and a pair of tracks. The power train module includes a pair of oppositely outwardly extending hollow trunnions, a wheel rotatably supported on each trunnion and engaging each track, and means for rotating each of the wheels. And advantageously, coupling means is used for resiliently connecting the power train module to the vehicle frame and minimizing the transmission of noise thereto.

In accordance with another aspect of the invention, there is provided a mounting arrangement for a vehicular power train module including a transmission, a cross drive mechanism having a pair of oppositely disposed hollow trunnions, and a wheel supported on each trunnion. A vehicle frame includes a pair of members individually defining a pocket, and the mounting arrangement includes first coupling means for resiliently supporting each of the trunnions in the respective pockets to allow the power train module to be positioned therein or removed therefrom as a unit, and second coupling means for resiliently supporting the transmission on the frame and resisting torque loads about the transverse axis of the trunnions.

In accordance with a further aspect of the invention, there is provided a mounting arrangement for a power train module of a vehicle including a rearwardly disposed cross drive mechanism having a pair of hollow trunnions. The vehicle frame defines a pair of generally semicylindrical pockets that face at least partially upwardly and rearwardly, and a pair of retaining caps individually defining another generally semicylindrical pocket. Also, coupling means are provided for resiliently supporting each of the hollow trunnions within the respective pockets, such that the power train module can be lowered and urged forwardly at an inclined angle into a resting position within the pockets, with the retaining caps being connected to the frame in embracing relation to the coupling means.

In accordance with a still further aspect of the invention there is provided a mounting arrangement for a power train module including a pair of hollow trunnions extending oppositely outwardly along a transverse central axis, a wheel rotatably supported on each trunnion, and an output drive train for rotating each of the wheels. An endless elastomeric drive belt is frictionally driven by each of the wheels and mounting means are provided for releasably connecting the trunnions to the vehicle frame at an elevated position and subjecting the drive wheels to the tension loading and weight of the respective drive belt independently of the weight of the frame.

More specifically, the instant mounting arrangement utilizes an elastomeric bushing assembly entrapped between a generally semicylindrical pocket in the main frame and a corresponding pocket in a releasable retaining cap to resiliently support each of the oppositely outwardly extending hollow trunnions of the power train module's cross drive mechanism. The power train module's transmission extends longitudinally and a pair of upright "mushroom" type mounts are used for resiliently supporting the transmission on the main frame and for resisting torque loads about the transverse central axis of the hollow trunnions. Moreover, the output drive train for each of the wheels includes a final drive planetary gear set located laterally inwardly of each of the trunnions so that the construction of the wheel support is simplified.

BRIEF DESCRIPTION OF THE DRAWINGS

FIG. 1 is a diagrammatic, right side elevational view of a track-type vehicle incorporating a mounting arrangement for a power train module constructed in accordance with the present invention;

FIG. 2, is a diagrammatic, enlarged and fragmentary portion of the power train module and mounting arrangement shown in FIG. 1 with the right drive wheel removed in order to illustrate a first coupling device in longitudinal section about a hollow trunnion of a cross drive mechanism, and with a window broken away in the main frame to illustrate a second coupling device at the front of an associated transmission;

FIG. 3 is an enlarged and fragmentary end elevational view of the second coupling device as taken along line III—III of FIG. 2;

FIG. 5 is an enlarged rear elevational view solely of the left half of the vehicle main frame shown in FIGS. 1–4 to illustrate details of the construction thereof.

BEST MODE FOR CARRYING OUT THE INVENTION

Figure 4:
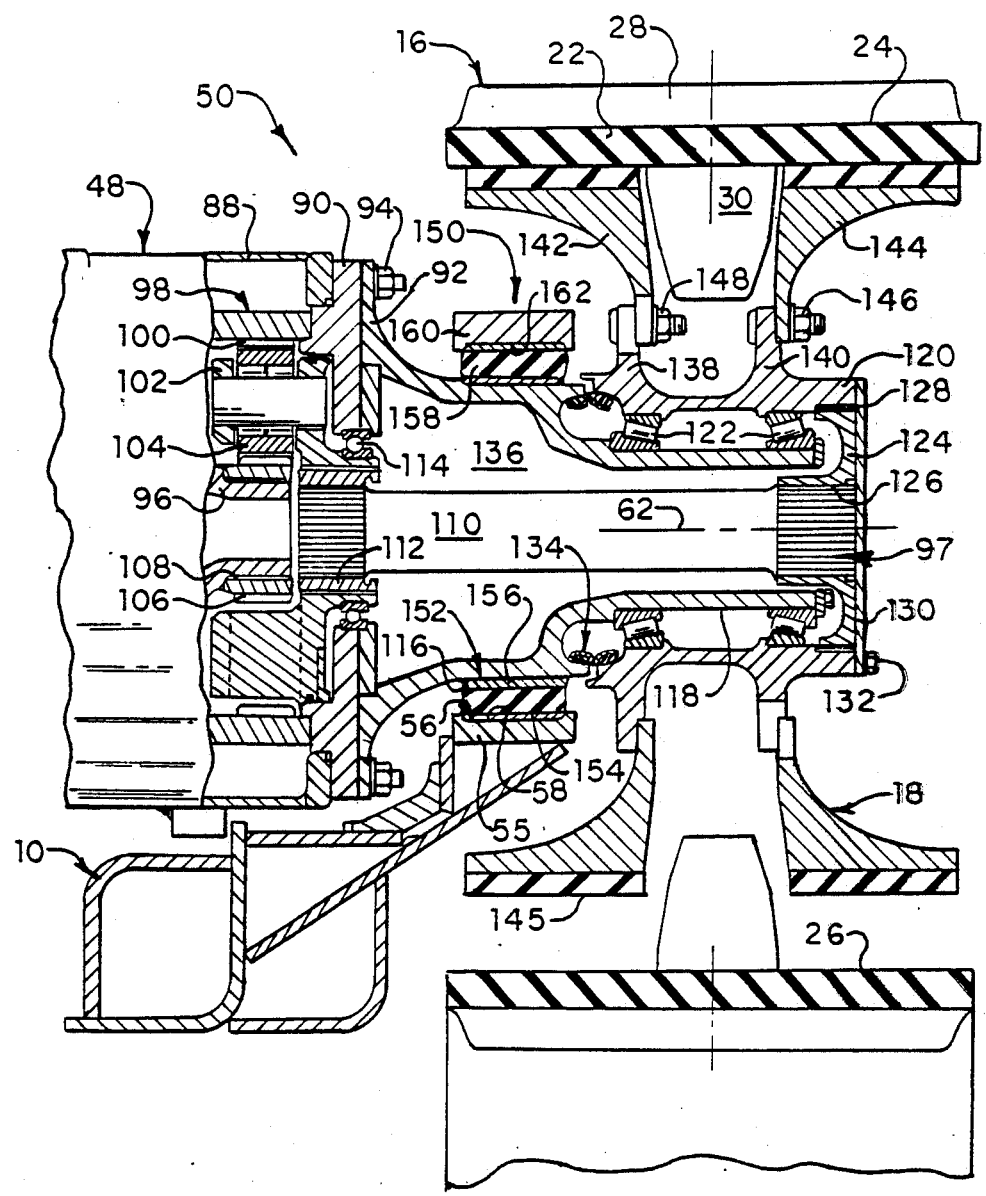
FIG. 4 is a diagrammatic, cross sectional view of the cross drive mechanism, right drive wheel, and mounting arrangement therefor as taken through the transverse central axis along line IV—IV of FIG. 2 with a few element shown in elevation for convenience.

Referring to FIG. 1, there is shown a track-type vehicle 8 including a main frame 10 having a front end 12 and a rear end 14 located respectively to the right and left when viewing the drawing. The vehicle is propelled longitudinally in each direction by a parallel pair of ground-engaging endless tracks 16, one of which is illustrated. The right side of the vehicle shown in FIG. 1 is a mirror image of the left side so that only one side need be described.

Each of the tracks 16 is driven by an elevated rear drive wheel 18, and the vehicle 8 is supported by a plurality of relatively large diameter idler wheels 19 and a plurality of smaller supporting roller wheels 20 connected to the main frame 10 in any suitable way. Preferably, each of the tracks is an elastomeric drive belt which encircles the wheels 18, 19 and 20, in the form of an endless loop for smoother high speed operation and better noise control. As is shown in FIG. 4, each drive belt includes an endless body 22 of generally rectangular cross section having a relatively planar exterior surface 24 and a relatively planar interior surface 26. A plurality of cleats 28 extend integrally outwardly from the exterior surface and a plurality of guide members 30 extend integrally inwardly from the interior surface. Although not illustrated, the body preferably has internal reinforcement in the form of a plurality of parallel wire cables for resisting the required belt tension loads and to provide the desired stiffness.

As shown in FIG. 1, an operator's cab 32 is located at the front of the main frame 10. An engine 34 is disposed generally below the cab and to the rear thereof, and is adapted to drive a hydrodynamic torque converter 36 in a conventional manner. An output shaft 38 from the torque converter drives a power train module 40 along a longitudinally extending central axis 42 oriented upwardly and rearwardly at a preselected angle B from a horizontal plane 44 as best shown in FIG. 2. Basically, the power train module 40 includes a longitudinally extending, reversible multi-speed transmission 46 and a steerable cross drive mechanism 48 releasably connected to the transmission and driven by it. Preferably, the transmission 46 provides six forward and two reverse speeds and is of the multiple planetary gear set type having power shifting capability.

Advantageously, a mounting arrangement 50 is provided for releasably connecting the power train module 40 in a simple manner to the main frame 10. The main frame is fabricated from a plurality of beams into a skeletal structure as can be visualized from the fragmentary, left side, rear elevational view thereof in FIG. 5. A longitudinally extending, upright left sidewall or frame member 52 of box-like construction extends rearwardly to define a laterally outwardly extending bracing structure 54 and a pillow block 55 having a semicylindrical pocket 56. The pillow block has a central channel 58 and upstanding edge flanges 60 at either side thereof, and as may be visualized by general reference to FIG. 2, these surfaces are radially related to a horizontal, transverse central axis 62. Advantageously, the pillow block pocket 56 is arranged to face upwardly and rearwardly such that a pair of mounting surfaces 64 are located on an inclined plane 66 passing through the central axis at a preselected angle A from the horizontal plane 44 as is illustrated in FIG. 2. In the instant example, this angle is approximately 48°.

The left and right sidewalls 52 are weldably connected together at the rear by a lower horizontal cross beam 68. An upper convexly-shaped cross beam 70 is releasably connected to the sidewalls directly above the lower cross beam by a plurality of threaded fasteners or bolts 72. Forwardly thereof, in the longitudinal region of the torque converter output shaft 38 are located a lower horizontal cross beam 74, an upper horizontal cross beam 76, and a pair of vertical reinforcement beams 78 that are weldably interconnected to form a relatively large longitudinal passage 80 through the main frame 10. The beams as well as the opposite pillow blocks 55 are arranged in a symmetrical manner with respect to vertical, longitudinally extending mid-plane 82. The forwardly disposed lower cross beam 74 has an upper surface 84, and affixed thereto are a pair of upright, cylindrical mounting blocks 86 also symmetrically disposed at either side of the mid-plane.

Referring to FIG. 4, the cross drive mechanism 48 can be noted to include a central housing 88, and on the right side an intermediate support wall 90, and an outwardly extending hollow trunnion or dead spindle 92 releasably connected together by a plurality of peripherally arranged threaded fasteners or bolts 94. The left side of the cross drive mechanism is of similar construction. Although not illustrated, the cross drive mechanism preferably includes a planetary differential steering mechanism of the type disclosed in U.S. Pat. No. 4,434,680 issued Mar. 6, 1984 to C. W. Riediger, et al. A tubular output member 96 extends laterally outwardly and generally along the transverse central axis 62 from each side of the referenced differential steering mechanism and provides the input to an output drive train 97 including a final drive planetary gear set 98. By the term "final drive" it is meant that there is no further gearing between the output member thereof and the drive wheel 18. The planetary gear set includes an internally toothed ring gear 100, a planet carrier 102 on which are mounted a plurality of planet gears 104, and a sun gear 106. The ring gear 100 is secured to the wall 90 and is thus stationary as a reaction. The differential output member 96 is connected for joint rotation with the sun gear 106 by a spline joint 108, such that with the rotation thereof the planet gears 104 are urged to walk around the ring gear 100 and cause the output planet carrier 102 to be driven at a reduced speed with respect to the sun gear. The output drive train 97 also includes an output axle shaft 110, and the planet carrier 102 is adapted to drive the axle shaft through an intermediate coupling ring 112 splined to both for manufacturing convenience. The planet carrier 102 is rotatably supported by a ball bearing assembly 114 mounted within the intermediate wall 90, and this serves to center the axially inner end of the axle shaft along the central axis 62.

Keeping in mind that the opposite outer sides of the cross drive mechanism 48 are substantially mirror images of each other, the axle shafts 110 may be noted to extend laterally outwardly through the hollow trunnions 92. Each of the trunnions externally defines a first cylindrical surface 116 of a diameter smaller than the ring gear 100 of this planetary gear set 98, and a second cylindrical surface 118 of a smaller diameter than the first cylindrical surface at the distal end thereof. The rear drive wheel 18 includes an inner hub 120 rotatably mounted on an opposed pair of tapered roller bearing assemblies 122 seated on the second cylindrical surface 118. The distal end of the axle shaft 110 is releasably secured to an annular connector 124 through an inner spline joint 126, and the annular connector is adapted to conjointly rotate the wheel hub 120 through an outer spline joint 128. An end plate 130 is releasably secured to the hub by a plurality of threaded fasteners or bolts 132. The end plate and an annular seal ring assembly 134 connected between the trunnion 92 and the wheel hub 120 serve to define an internal chamber 136. The wheel hub has two scalloped flanges 138 and 140 whose scallops are circumferentially offset with respect to each other and on which are mounted an inner wheel portion 142 and an outer wheel portion 144. These wheel portions collectively define a divided, but relatively smooth cylindrical external surface 145. An axially outer, peripherally spaced plurality of threaded fasteners or bolts 146 are used to releasably secure the outer wheel portion 144 to the outer flange 140. When these outer fasteners are released, the track 16 can be removed laterally outwardly from the wheel 18. Thereafter, the release of an axially inner plurality of threaded fasteners 148 can allow the inner wheel portion 142 to be removed laterally outwardly over the outer flange 140 by circumferentially angularly indexing it with respect to the scallops or slots, not shown in detail, in the outer flange 140 in a conventional manner. When the wheel portions are assembled on the respective flanges, it is to be noted that the track guide members 30 are entrapped therebetween with a preselected degree of transverse clearance.

As shown in FIGS. 2 and 4, the mounting arrangement 50 of the present invention includes first elastomeric coupling means 150 for resiliently supporting the hollow trunnions 92 of the cross drive mechanism 48 in the respective pockets 56 of the pillow blocks 55. Specifically, the first coupling means 150 includes a pair of first coupling devices or generally cylindrical bushing assemblies 152 individually defined by an outer metal band 156 and an elastomeric or rubber ring 158 entrapped between the bands. Preferably, the elastomeric ring is bonded to the external surface of the inner band, and is solely frictionally connected to the internal surface of the outer band under a preselected compressive preload. The outer band 154 is entrapped in the central channel 58 of the pocket 56, and the main frame 10 includes a retaining cap 160 that defines a semicylindrical pocket 162 which is a mirror image of the pocket 56 to releasably secure the bushing assembly 152 in place. A plurality of fasteners or bolts 164 extend through the retaining cap and are screwthreadably received in the pillow block 55 to secure the cap embracingly about the bushing assembly 152.

As shown in FIGS. 2 and 3, the mounting arrangement 50 also includes second elastomeric coupling means 166 for resiliently supporting the front of the transmission 46 on the lower cross beam 74 of the main frame 10. The second coupling means includes a pair of second coupling devices or upright columnar "mushroom" mounts 168 which are individually releasably secured to the respective mounting blocks 86 by a fastener or bolt 172 screwthreadably received in the blocks. A mounting bracket 174 is releasably secured to a front face of the transmission 46 by a plurality of threaded fasteners or bolts 176. The bracket has a horizontal deck 178 having two cylindrical apertures 180 therethrough that define a pair of upright or substantially parallel axes 182 and 184 which are preferably equally spaced from the longitudinal mid-plane 82. Each of these mounts includes upper and lower elastomeric or rubber bushings 186 and 188 of similar stepped cylindrical construction arranged in facing relation so that the larger diameter portions or flanges thereof contain the deck 178 therebetween. Each of the bushings extends approximately half way through the respective deck aperture 180, and each has a tubular metal sleeve 190 centrally thereof. An upper end plate 192 is engaged by the bolt 172, which extends through the sleeves 190 to engage the mounting blocks. The bolts are screwthreadably inserted into the respective blocks until the end plate and the two sleeves are engaged together and tightly against the block to establish a preselected compressive preload of each bushing with respect to the centrally mounted deck.

Industrial Applicability

In operation, each of the opposite differential output members 96 shown in FIG. 4 can be rotated at the same speed in each of a plurality of speed ranges as is determined by the speed setting of the transmission 46. This causes the opposite sun gears 106 to rotate therewith, whereupon the planet gears 104 are caused to walk around the stationary ring gears 100 and to drive the planet carriers 102 at a reduced rotational speed with respect to that of the sun gears. The axle shafts 110, the connectors 124, and the drive wheels 18 are thereby caused to rotate at the same speeds as the planet carriers so that the tracks or belts 16 are correspondingly driven at equal rates of speed for longitudinal operation of the vehicle in either direction.

In order to steer or turn the vehicle, the differential steering mechanism of U.S. Pat. No. 4,434,680 within cross drive mechanism 48 is operated so as to controllably speed up one of the output members 96 while simultaneously reducing the speed of the opposite output member 96. It is to be appreciated that the exact form of the steering mechanism is of no patentable significance to the present invention. When the speed of the left output member increases, the left drive wheel 18 speeds up proportionately, and the speed of the right output member and right drive wheel is reduced to cause the vehicle to turn to the right when traveling forwardly.

The mounting arrangement 50 allows the convenient disassembly of the vehicle which can be visualized by reference to FIG. 4. The fasteners 146 can be screwthreadably removed to allow the outer wheel portion 144 of the rear drive wheel 18 to be removed. This can enable the track or belt 16 to be removed laterally away from its encircling relationship to the rear drive wheel and the wheels 19 and 20 shown in FIG. 1. The power train module 40 can thereafter be removed from the main frame 10 by uncoupling the output shaft 38 shown in FIG. 2 at the front of the transmission 46 in a conventional manner, by basically disassembling the front coupling devices 168, and by removing the retaining caps 160 of the rear coupling devices 152. Each of the front coupling devices 168 shown in FIG. 3 can be disassembled from the main frame 10 by screwthreadably removing the fastener 172 from the support block 86. Each of the rear coupling devices 152 shown in FIG. 2 is released from a locked engagement with the main frame by screwthreadably disassembling the fasteners 164 from the pillow blocks 55 and removing the retaining caps 160 along the inclined mounting surface 64. In the instant embodiment the upper rear cross beam 70 is removed from engagement with the sidewalls 52 by release of the fasteners 72 shown in FIG. 5. This permits a conventional lifting device, not shown, to be secured to the power train module 40 so that it can be elevated and urged rearwardly in the generally 10 o'clock angular direction as is indicated by the directional arrow identified by the letter A in FIG. 2. Thus, the power train module can be removed without disassembling a large number of components elevationally above it; this is in part due to its favorable location at the rear end of the main frame and due to the forward location of the operator station or cab 32.

It is to be appreciated that the assembly of the power train module 40 on the main frame 10 is merely the reverse of the action described immediately above, with the power train module 40 being simultaneously lowered and urged forwardly into position in essentially the 4 o' clock direction when viewing FIG. 2.

Besides the convenient assembly and disassembly of the power train module 40, the mounting arrangement 50 features the rear and front coupling devices 152 and 168 for resiliently and elastomerically supporting the power train module on the main frame 10 such that the rear drive wheels 18 are located at an elevated position away from the ground and for noise-inhibiting purposes. As is shown in FIG. 1, each of the elevated drive wheels 18 is subjected to the tension loading, torque loading and weight of the respective elastomeric drive belt 16 independently of the weight of the main frame 10. That is, the rear drive wheels desirably do not carry any of the weight of the vehicle's superstructure. On the other hand, the idler wheels 19 and 20 do carry such weight and are preferably resiliently connected to the vehicle main frame for smoother operation of the vehicle over rough terrain and for maintaining a preselected tension level in the drive belts. The cylindrical external surfaces 145 of the drive wheels and the relatively planer or smooth interior surfaces 26 of the drive belts shown in FIG. 4 greatly reduces the transmission of noise from the belts to the drive wheels. Thus the drive belts are frictionally driven, whereas in marked contrast the vast majority of prior art vehicles have used interengaging teeth on the wheels for positively driving the belts and metallic, multi-jointed track chains that have generated vibrations and noise at very high levels.

Since the drive wheels 18 are elevated, there is less tendency for mud or the like to be entrapped between the drive wheels and the drive belt 16 than those systems having drive wheels located near the ground line. Moreover, the drive wheels are located longitudinally beyond and to the rear of all of the other wheels 19 and 20 so that the circumferential angular degree of contact between the drive wheels and the drive belt is approximately 150° when viewing along transverse axis 62. This relatively significant angular relationship assures a substantial area of frictional contact for more positive engagement therebetween.

Turning now to the physical characteristics of the rear elastomeric bushing assemblies 152, the opposite elastomeric rings 158 are substantially concentrically arranged with respect to the transverse axis 62. They are constructed to be relatively stiff radially in their respective vertical longitudinal planes. Thus, they are desirably built to resist the relatively substantial forces due to tension of the drive belts 16 and also to support a portion of the weight of the power train module 40. On the other hand, they are softer in the torsional direction about the transverse axis. Accordingly, the front elastomeric mounts 168 are constructed to resist torsional forces about the transverse axis 62 and to support the remaining portion of the weight of the power train module. The front mounts are substantially vertically oriented, are relatively stiff in that direction, and are relatively soft in the lateral direction or radially away from the axes 182 and 184. This construction not only inhibits noise transmission to the main frame 10, but also substantially eliminates any distortion or twisting of the main frame from being directly communicated to the hollow trunnions 92 and housing 48, and to the transmission 46 of the power train module.

In view of the foregoing, it is apparent that the mounting arrangement 50 of the present invention is simple, economical and effective. The arrangement of the components of the cross drive mechanism 48 generally concentrically along the single transverse axis 62 allows the convenient angled assembly of the trunnions 92 into the inclined pockets 56 in the rear pillow blocks 55. The rear drive wheels 18 are rotatably mounted on the trunnions and solely frictionally engage the elastomeric drive belt at an elevated position away from the earth for better frictional contact and so that noises generated thereat are greatly reduced. Moreover, rear coupling devices 152 and front coupling devices 168 are integrated with such construction which individually contain elastomeric vibration-isolating elements for accomodating twisting forces between the power train module 40 and the main frame 10 and for greatly reducing the transmission of undesirable vibrations and noise to the main frame and to the operator. And furthermore, since the final drive planetary gear sets 98 are located within central housing 88 laterally inwardly of the rear coupling devices 152 the construction of the rear coupling devices, and hollow trunnions 92 and support and drive structure for the wheels 18 is simplified.

It should further be appreciated that the vibration-isolation qualities of the first and second coupling means 150 and 166 could be dispensed with, and metal-to-metal connections made thereat after the removal of the elastomeric rings 158 and the elastomeric bushings 186 and 188, while still retaining many of the advantages and benefits of the mounting arrangement 50. Specifically, for example, the cross drive mechanism 48 with its inboard final drive planetary gear sets 98 and outboard hollow trunnions 92 could still be conveniently connected to or removed from the main frame 10 with the drive wheels 18 being located at an elevated position and so they are not subjected to the weight of the frame 10 and vehicle superstructure.

Other aspects, objects and advantages of this invention can be obtained from a study of the drawings, the disclosure and the appended claims.

I claim:

1. A mounting arrangement for a power train module of a vehicle having a frame and a pair of endless tracks, comprising:
   the power train module having a pair of oppositely outwardly extending hollow trunnions, a wheel rotatably supported on each of the trunnions and drivingly engaging each of the tracks, and output means for drivingly rotating each of the wheels;
   the frame defining a pair of generally longitudinally arranged, semicylindrical pockets that face inclinably upwardly and longitudinally outwardly;
   bushing assembly means for resiliently supporting each of the trunnions in the respective pockets of the frame along a transverse axis; and
   mount means connected to the frame longitudinally inwardly of the pockets for resiliently resisting rotational forces of the power train module about the transverse axis, the bushing assembly means and the mount means minimizing the transmission of noise to the frame.

2. The mounting arrangement of claim 1 wherein the frame defines a pair of mounting surfaces located on an inclined plane and includes a pair of retaining caps individually releasably secured to the mounting surfaces and defining a generally semicylindrical pocket for releasably securing the bushing assembly means in place.

3. The mounting arrangement of claim 2 wherein each of the wheels and bushing assembly means is subject to the tension loading and weight of the respective track and is not subject to any forces due to the weight of the frame by being located at an elevated position away from the ground.

4. The mounting arrangement of claim 2 wherein the bushing assembly means includes an elastomeric ring disposed in generally encircling and supporting relation to each of the trunnions.

5. A mounting arrangement for a power train module of a vehicle, comprising:
   the power train module including a transmission, a cross drive mechanism connected thereto having a pair of oppositely outwardly extending hollow trunnions arranged along a transverse axis, a wheel rotatably supported on each trunnion, and output means extending through each trunnion and drivingly engaged with the respective wheel;
   a vehicle frame including a pair of members individually defining a generally semicylindrical pocket, each of the pockets being inclined to face upwardly and longitudinally outwardly;
   first coupling means for resiliently supporting each of the trunnions of the cross drive mechanism in the respective pocket, the power train module being positionable in and being removable from the pockets in an angularly inclined manner as a unit; and
   second coupling means for resiliently supporting the transmission on the frame and resisting torque loads about the transverse axis.

6. The mounting arrangement of claim 5 wherein the first coupling means includes an elastomeric ring disposed in an encircling relationship to each trunnion.

7. The mounting arrangement of claim 6 wherein the first coupling means includes an inner bane within each ring and an outer band exteriorly of each ring, the outer bands being seated in the respective pockets.

8. The mounting arrangement of claim 7 wherein the frame includes a pair of retaining caps individually defining a generally semicylindrical pocket, the retaining caps being releasably connected to the frame members such that the respective pockets of the frame members and the retaining caps face each other in surrounding relationship to the outer bands.

9. The mounting arrangement of claim 8 wherein the frame includes a cross member and the second coupling means includes an upright, columnar resilient mount including an elastomeric member connected between the cross member and the transmission.

10. The mounting arrangement of claim 9 wherein the columnar resilient mount includes another elastomeric member connected to the cross member, and the transmission includes a deck elevationally contained between the elastomeric members.

11. The mounting arrangement of claim 5 wherein the first coupling means includes a bushing assembly for each trunnion including radially outer and inner bands and an annular elastomeric ring connected between the bands.

12. The mounting arrangement of claim 5 wherein the transmission includes a deck, and the second coupling means includes a columnar resilient mount having an upper elastomeric member and a lower elastomeric member, the deck being resiliently contained between the elastomeric members.

13. The mounting arrangement of claim 5 wherein each of the elastomeric members is a bushing of stepped cylindrical construction.

14. The mounting arrangement of claim 5 wherein the first coupling means includes an elastomeric bushing assembly seated in each of these pockets, and the frame includes a pair of retaining caps individually releasably secured to the respective frame member in embracing relationship to the bushing assembly.

15. A mounting arrangement for a power train module of a vehicle having a front end and a rear end, the power train module including a forwardly extending transmission and a rearwardly disposed cross drive mechanism connected thereto, comprising:
   the cross drive mechanism having a pair of oppositely outwardly extending hollow trunnions;
   a vehicle frame including a pair of frame members individually defining a first generally semicylindrical pocket that faces inclinably upwardly and rearwardly and a pair of mounting surfaces located on an inclined plane, and a pair of retaining caps releasably secured to the respective mounting surfaces and individually defining a second generally semicylindrical pocket; and
   an elastomeric bushing assembly resiliently supporting each of the hollow trunnions within the respective pockets, the frame being so constructed and arranged that the power train module can be conveniently lowered and urged forwardly at an inclined angle into a resting position within the pockets of the frame members with the retaining caps being releasably secured tot eh frame members in embracing relation to the elastomeric bushing assemblies.

16. The mounting arrangement of claim 15 wherein the cross drive mechanism includes a wheel rotatably supported on each of the trunnions and the vehicle includes a pair of endless tracks individually driven by the respective wheels, and each of the wheels is located elevationally above the ground such that the wheels and bushing assemblies are subject to the tension loading and weight of the respective track and are not subjected to any forces due to the weight of the frame.

17. The mounting arrangement of claim 16 including an upright resilient mount constructed and arranged for resiliently supporting the transmission on the frame forwardly of the bushing assemblies and resisting rotational forces about the trunnions and the bushing assemblies.

18. A mounting arrangement for a power train module of a belted track-type vehicle having a frame, comprising:
   the power train module including a pair of hollow trunnions extending oppositely along a transverse central axis, a pair of wheels individually having a generally cylindrical external surface, bearing means for rotatably supporting one of the wheels on each of the trunnions, and output means for rotating each of the wheels;
   an endless elastomeric drive belt frictionally driven by the generally cylindrical external surface of each of the wheels;
   first coupling means for resiliently supporting and releasably connecting the trunnions of the power train module to the frame at an elevated position above the ground and subjecting the wheels and the first coupling means to the tension loading and weight of the respective drive belt while not subjecting the wheels and the first coupling means to the weight of the frame, and for minimizing the transmission of noise from the respective trunnion to the frame as a reduced noise level is generated in use by the frictional engagement of the respective wheels and drive belts and thereafter is directed to the bearing means and the trunnions; and
   second coupling means for resiliently supporting the power train module on the frame, resisting torque loads about the trunnions, and minimizing the transmission of noise to the frame.

19. The mounting arrangement of claim 18 wherein the first coupling means includes an elastomeric ring disposed in an encircling relationship to each trunnion.

20. A mounting arrangement for a power train module of a belted track-type vehicle having a frame, comprising:
   the power train module defining a pair of oppositely outwardly extending hollow trunnions, a pair of wheels individually having a generally cylindrical external surface, bearing means for rotatably supporting one of the wheels on each trunnion, and output means extending through each trunnion for drivingly rotating each of the wheels;
   bushing assembly means for resiliently connecting each of the trunnions to the frame at a position locating the wheels and the trunnions elevationally above the ground and minimizing the transmission of noise to the frame from the trunnions; and
   an endless elastomeric drive belt solely frictionally driven by the generally cylindrical external surface of each of the wheels, so as to communicate in use a reduced noise level via the bearing means to the trunnions, the bushing assembly means and the wheels being so constructed and arranged that the bushing assembly means and the wheels are subject to the forces due to tension loading and the weight of the drive belt while not being subject to any forces due to the weight of the frame.

21. A mounting arrangement for a power train module of a belted track-type vehicle having a frame, comprising:
   the power train module including a pair of hollow trunnions extending oppositely along a transverse central axis, a wheel having a generally cylindrical external surface rotatably connected to each of the hollow trunnions, and output means for controllably rotating each of the wheels;
   an endless elastomeric drive belt solely frictionally driven by the generally cylindrical external surface of each of the wheels and thereby minimizing the transmission of noise to the wheels; and
   elastomeric coupling means for resiliently supporting the power train module on the frame, locating the wheels at an elevated position away from the ground, and minimizing the transmission of noise between the trunnions and the frame that is generated within the power train module and at the wheels, the coupling means including an outer metal band connected to the frame, an inner metal band connected to the trunnion, and an elastomeric ring connected between the bands.

* * * * *